United States Patent
Rho (10) Patent No.: US 11,645,008 B2
(45) Date of Patent: May 9, 2023

(54) MEMORY SYSTEM AND OPERATING METHOD THEREOF FOR CONTROLLING A MULTI-PLANE READ OPERATION

(71) Applicant: SK hynix Inc., Gyeonggi-do (KR)

(72) Inventor: Jun Rye Rho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 11 days.

(21) Appl. No.: 17/149,353

(22) Filed: Jan. 14, 2021

(65) Prior Publication Data

US 2021/0382656 A1 Dec. 9, 2021

(30) Foreign Application Priority Data

Jun. 9, 2020 (KR) .................. 10-2020-0069625

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0611; G06F 3/0656; G06F 3/0658; G06F 3/0688; G11C 16/10; G11C 16/26; G11C 16/0483
See application file for complete search history.

(56) References Cited

U.S. PATENT DOCUMENTS

| | | | | |
|---|---|---|---|---|
| 2006/0221696 | A1* | 10/2006 | Li | G11C 7/22 365/185.12 |
| 2013/0346671 | A1* | 12/2013 | Michael | G06F 3/0679 711/E12.008 |
| 2016/0034352 | A1* | 2/2016 | Michael | G06F 11/1064 714/773 |
| 2019/0227749 | A1* | 7/2019 | Wakchaure | G06F 3/0659 |
| 2020/0151106 | A1* | 5/2020 | Ahn | G06F 12/0882 |
| 2021/0312989 | A1* | 10/2021 | Yun | G11C 29/028 |
| 2022/0044746 | A1* | 2/2022 | Hsu | G11C 11/5628 |

FOREIGN PATENT DOCUMENTS

KR 10-2010-0089509 8/2010

* cited by examiner

*Primary Examiner* — Charles Rones
*Assistant Examiner* — Tong B. Vo
(74) *Attorney, Agent, or Firm* — IP & T Group LLP (57) ABSTRACT

An operating method of a memory system that includes a memory device including a plurality of planes and a plurality of page buffers for the plurality of planes, respectively, and a controller suitable for controlling the memory device, the operating method includes: providing, by the controller, the memory device with page read commands for respective target planes among the plurality of planes; simultaneously reading, by the memory device, data from the target planes and buffering the data in target page buffers corresponding to the respective target planes in response to the page read commands; selectively providing, by the controller, the memory device with an all-plane data output command or respective-plane data output commands from which target page addresses are omitted; and sequentially outputting, by the memory device, the data buffered in the target page buffers, in response to the all-plane data output command or the respective-plane data output commands.

13 Claims, 7 Drawing Sheets

MEMORY SYSTEM AND OPERATING METHOD THEREOF FOR CONTROLLING A MULTI-PLANE READ OPERATION

CROSS-REFERENCE TO RELATED APPLICATION(S)

The present application claims priority under 35 U.S.C. § 119(a) to Korean Patent Application No. 10-2020-0069625, filed on Jun. 9, 2020, the disclosure of which is incorporated herein by reference in its entirety.

BACKGROUND

1. Field

Various embodiments of the present disclosure generally relate to a memory system including a memory device and a controller.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments of the present disclosure are directed to a memory system that may reduce a time, required for a multi-plane read operation of a memory device, by providing a simplified command in order to control the multi-plane read operation.

In accordance with an embodiment, an operating method of a memory system that includes a memory device including a plurality of planes and a plurality of page buffers for the plurality of planes, respectively, and a controller suitable for controlling the memory device, the operating method includes: providing, by the controller, the memory device with page read commands including target page addresses of respective target planes among the plurality of planes; simultaneously reading, by the memory device, data from the target planes and buffering the data in target page buffers corresponding to the respective target planes in response to the page read commands; selectively providing, by the controller, the memory device with an all-plane data output command from which the target page address is omitted or respective-plane data output commands from which the target page addresses are omitted; and sequentially outputting, by the memory device, data buffered in the target page buffers, in response to the all-plane data output command or the respective-plane data output commands.

In accordance with an embodiment, a memory system includes: a memory device including a plurality of planes and a plurality of page buffers for the plurality of planes, respectively; and a controller suitable for controlling the memory device, wherein the controller provides the memory device with page read commands including target page addresses of respective target planes among the plurality of planes, the memory device simultaneously reads data from the target planes and buffers the data in target page buffers corresponding to the respective target planes in response to the page read commands; the controller selectively provides the memory device with an all-plane data output command from which the target page address is omitted or respective-plane data output commands for the respective planes from which the target page addresses are omitted; and the memory device sequentially outputs data buffered in the target page buffers, in response to the all-plane data output command or the respective-plane data output commands.

In accordance with an embodiment, a memory system includes: a memory device including a plurality of planes and a plurality of page buffers corresponding to the plurality of planes; and a controller configured to control the memory device, wherein the controller provides the memory device with multiple read commands for the plurality of planes, the memory device simultaneously reads data from target pages of the plurality of planes and buffers the data in the plurality of page buffers in response to the multiple read commands, the controller provides the memory device with a data output command associated with all or each of the plurality of planes, the data output command configured to exclude addresses of the target pages; and the memory device sequentially outputs, to the controller, data buffered in the plurality of page buffers, in response to the data output command.

DETAILED DESCRIPTION

Various embodiments of the present disclosure are described below in detail with reference to the accompanying drawings. The following description focuses on features and aspects of the present invention. Well-known technical detail may be omitted so as not to obscure the subject matter of the disclosed embodiments. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
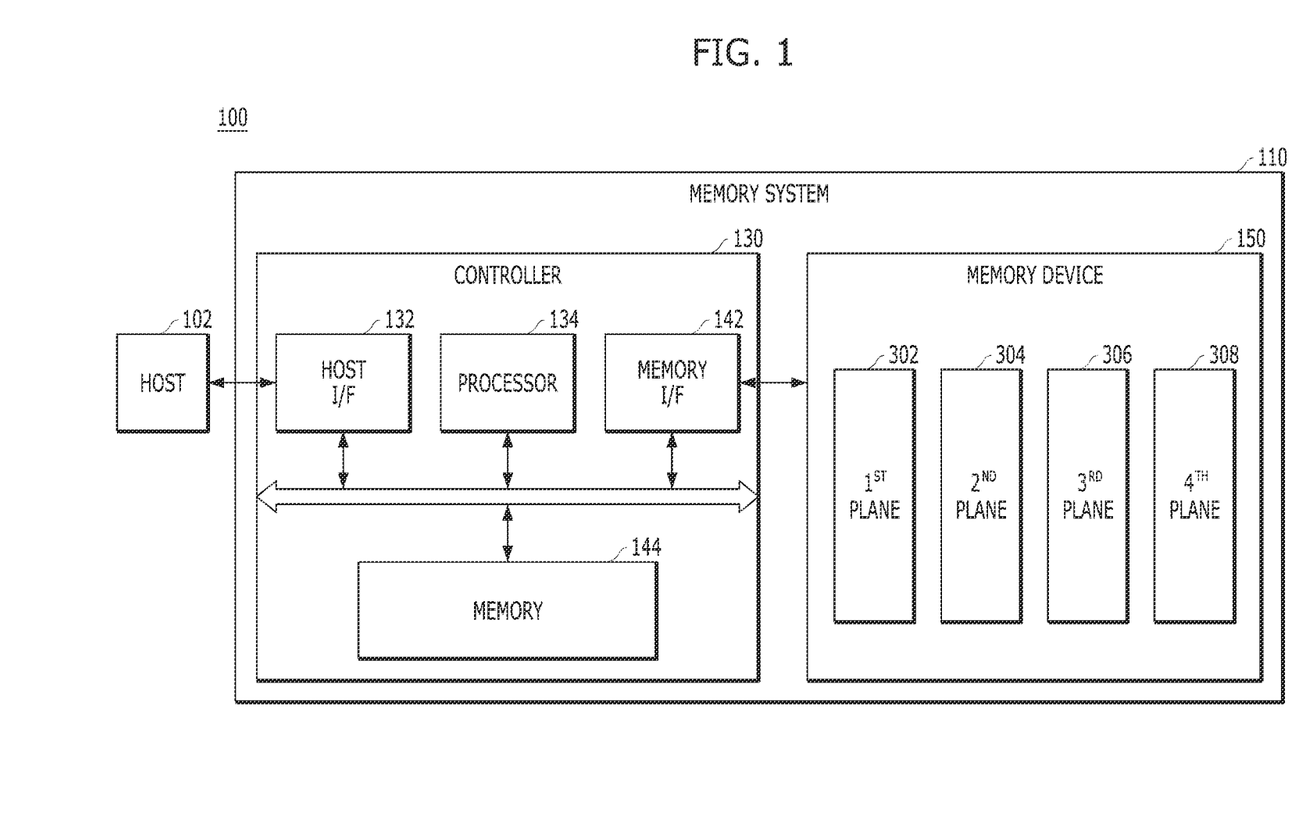
FIG. 1 is a block diagram schematically illustrating an example of a data processing system including a memory system in accordance with an embodiment.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall function and operation of the host 102, and provide interoperability between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control storage of data into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card such as, an international association (PCMCIA) card, a compact flash (CF) card, a smart media (SM) card, a memory stick, a multimedia card (MMC) including reduced size MMC (RS-MMC) and micro-MMC, a secure digital (SD) card including a mini-SD card, a micro-SD card and an SDHC card, or an universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

A flash memory may store data in a memory cell array composed of memory cell transistors. The flash memory may have a layered structure of a memory device, a plane, a memory block and a page.

The memory system 110 may include a plurality of memory devices, even though FIG. 1 illustrates one memory device 150. The memory device 150 may receive one command at a time. The memory device 150 may include a plurality of planes. By way of example, FIG. 1 illustrates that the memory device 150 including four planes 302, 304, 306 and 308. The planes 302, 304, 306 and 308 may process in parallel the command received by the memory device 150. Each of the planes 302, 304, 306 and 308 may include a plurality of memory blocks (not illustrated). Each of the memory blocks may be a minimum unit of an erase operation. One memory block may include a plurality of pages (not illustrated). Each of the pages may be a minimum unit of write and read operations.

The memory device 150 is described below with reference to FIG. 2.

Continuing to refer to FIG. 1, the controller 130 may control the memory device 150 in response to a request from the host 102. For example, the controller 130 may provide data read from the memory device 150 to the host 102, and store data provided from the host 102 into the memory device 150. Thus, the controller 130 may control read, program and erase operations of the memory device 150.

The controller 130 may include a host interface (I/F) 132, a processor 134, a memory I/F 142 such as a NAND flash controller (NFC), and a memory 144, all operatively coupled via an internal bus. Although not shown, the controller 130 may also include an error correction (ECC) component and a power management unit (PMU).

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by a static random access memory (SRAM) or a dynamic random access memory (DRAM). The memory 144 may be disposed within or out of the controller 130. FIG. 1 exemplifies the memory 144 disposed within the controller 130. In another embodiment, the memory 144 may be embodied by an external volatile memory having a memory interface transferring data between the memory 144 and the controller 130.

The processor 134 may control overall operation of the memory system 110. The processor 134 may drive firmware to control overall operation of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host 102. For example, the processor 134 may control a write operation of the memory device 150 in response to a write request from the host 102 and control a read operation of the memory device 150 in response to a read request from the host 102.

Also, the controller 130 may perform a background operation on the memory device 150 through the processor 134, which is realized as a microprocessor or a central processing unit (CPU). For example, the background operation performed on the memory device 150 may include a garbage collection (GC) operation, a wear-leveling (WL) operation, a map flush operation, or a bad block management operation.

Figure 2:
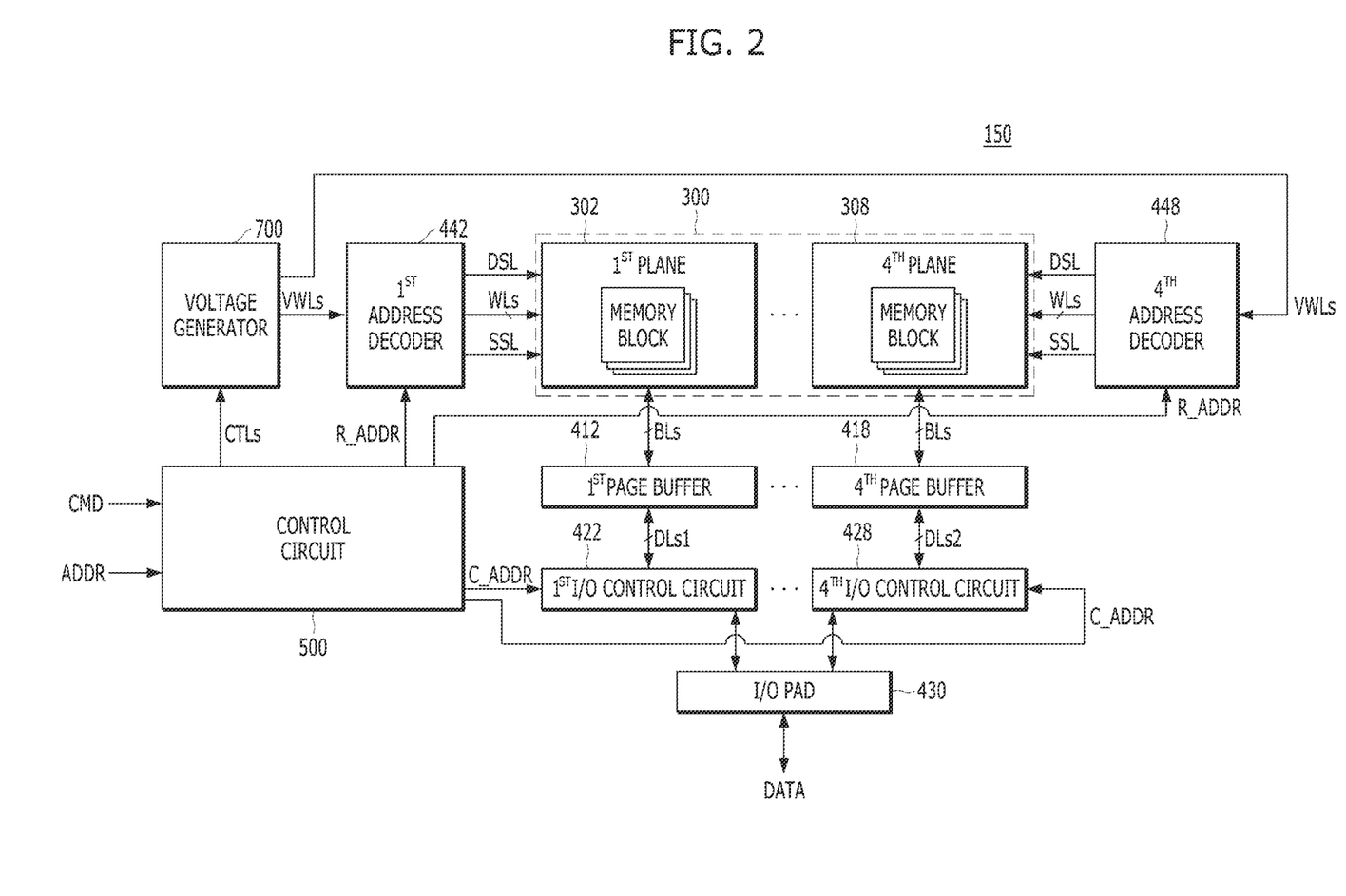
FIG. 2 is a block diagram illustrating a memory device in accordance with an embodiment.

FIG. 2 is a block diagram illustrating the memory device 150 in accordance with an embodiment.

Referring to FIG. 2, the memory device 150 may include a memory cell array 300, a plurality of address decoders, e.g., 442 and 448, a plurality of page buffers, e.g., 412 and 418, a plurality of input/output (I/O) control circuits, e.g., 422 and 428, an input/output (I/O) pad 430, a control circuit 500 and a voltage generator 700.

The memory cell array 300 may include first to fourth planes 302, 304, 306 and 308 as described above with reference to FIG. 1. Each of the planes 302, 304, 306 and 308 may include a plurality of memory blocks. Among the plurality of planes, FIG. 2 illustrates the first plane 302 and the fourth plane 308; the second and third planes are omitted for clarity. Also, although not directly shown, it can be understood from FIG. 2 that each of the second and third planes includes an associated address decoder, page buffer and I/O control circuit.

The planes may operate independently or two or more may operate simultaneously. For example, the first to fourth planes 302, 304, 306 and 308 may simultaneously perform read operations on data from memory cells. The memory device 150 may support a multi-plane read operation including an operation in which the plurality of planes simultaneously read the data.

Each of the planes may be coupled to a corresponding address decoder through a drain selection line DSL, a plurality of word lines WLs and a source selection line SSL. For example, the first plane 302 may be coupled to the first address decoder 442, and the fourth plane 308 may be coupled to the fourth address decoder 448. Further, a second address decoder may be coupled to the second plane 304 and a third address decoder may be coupled to the third plane 306.

Each of the planes may input and output data through a corresponding page buffer and a corresponding input/output control circuit. The first plane 302 may be coupled to the first page buffer 412, and the first page buffer 412 may be controlled by the first input/output control circuit 422. The fourth plane 308 may be coupled to the fourth page buffer 418, and the fourth page buffer 418 may be controlled by the fourth input/output control circuit 428. A second page buffer may be coupled to the second plane 304 and a third page buffer may be coupled to the third plane 306.

The control circuit 500 may control the voltage generator 700, the plurality of address decoders 442, . . . and 448 and the plurality of input/output control circuits 422, . . . and 428 based on a command CMD and an address ADDR received from an external device.

The voltage generator 700 may generate word line voltages VWLs for being supplied to the word lines according to an operation mode. A voltage generation operation of the voltage generator 700 may be controlled by control signals CTLs of the control circuit 500.

The plurality of address decoders 442, . . . and 448 may select a word line to which the word line voltages VWLs are applied, based on a row address signal R_ADDR of the control circuit 500. The plurality of address decoders 442, . . . and 448 may provide the selected word line with the word line voltages VWLs, and if necessary, provide a non-selected word line with the word line voltages VWLs. For example, the first address decoder 442 may provide the word lines of the first plane 302 with the word line voltages VWLs, and the fourth address decoder 448 may provide the word lines of the fourth plane 308 with the word line voltages VWLs. The second address decoder may provide the word lines of the second plane 304 with the word line voltages VWLs and the third address decoder may provide the word lines of the third plane 306 with the word line voltages VWLs.

The input/output control circuits 422, . . . and 428 may control input of data inputted from the input/output pad 430 or output of data outputted to the input/output pad 430 based on a column address signal C_ADDR of the control circuit 500. During a program operation, the first to fourth input/output control circuits 422, . . . and 428 may operate as write drivers that drive bit lines according to data to be stored in the first to fourth planes 302, 304, 306 and 308. During the program operation, the first to fourth input/output control circuits 422, . . . and 428 may receive the data to be stored in the first to fourth planes 302, 304, 306 and 308, respectively, through the input/output pad 430, and drive the bit lines according to the received data. During a read operation or a program verification operation, the first to fourth input/output control circuits 422, . . . and 428 may operate as sense amplifiers for reading the data from the first to fourth planes 302, 304, 306 and 308, respectively.

The first to fourth page buffers 412, . . . and 418 may buffer data DATA received through the input/output pad 430 and data DATA to be outputted through the input/output pad 430. Each of the first to fourth page buffers 412, . . . and 418 may include a plurality of latches (not illustrated).

According to an embodiment, the memory cell array 300 may be a three-dimensional memory cell array formed on a substrate in a three-dimensional structure, i.e., with a vertical dimension. In this case, the memory cell array 300 may include vertical memory cell strings including a plurality of memory cells formed by stacking one another.

Figure 3:
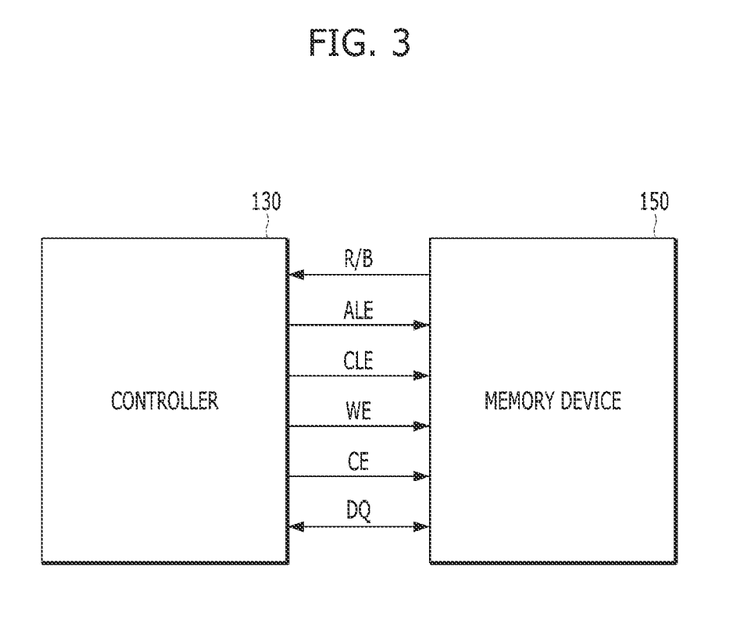
FIG. 3 is a block diagram for describing a signal exchanged between a controller and a memory device.

FIG. 3 is a block diagram for describing a signal exchanged between the controller 130 and the memory device 150.

Referring to FIG. 3, the controller 130 may provide the memory device 150 with a chip enable signal CE, thereby selecting one memory device 150 among a plurality of memory devices that may be included in the memory system 110.

The controller 130 and the memory device 150 may exchange data signals DQ. The controller 130 may provide the memory device 150 with a command CMD, an address ADDR and data DATA through the data signal DQ, and the memory device 150 may provide the controller 130 with the data DATA through the data signal DQ. Whether a signal transmitted by the controller 130 through the data signal DQ is the command CMD, the address ADDR or the data DATA may be specified through a command latch enable signal CLE, an address latch enable signal ALE and a write enable signal WE.

The memory device 150 may provide the controller 130 with internal operation state information of the memory device 150 through a ready/busy signal R/B.

A standard for a performance index of the memory system 110 has been increasing in response to an increase in speed of the host interface 132. For example, the performance index may include sequential read performance, sequential write performance, random read performance and random write performance.

In order for the memory system 110 to satisfy the standard for the performance index, it is preferable that a command processing time of the memory device 150 be reduced.

The command processing time may include the time it takes for the controller 130 to provide the memory device 150 with a command and the time it takes to exchange data between the controller 130 and the memory device 150.

According to an embodiment, the controller 130 may improve the speed of the memory interface 142 by reducing a command providing time associated with the multi-plane read operation of the memory device 150.

A multi-plane read operation of a memory device 150 is described with reference to FIG. 4.

Figure 4:
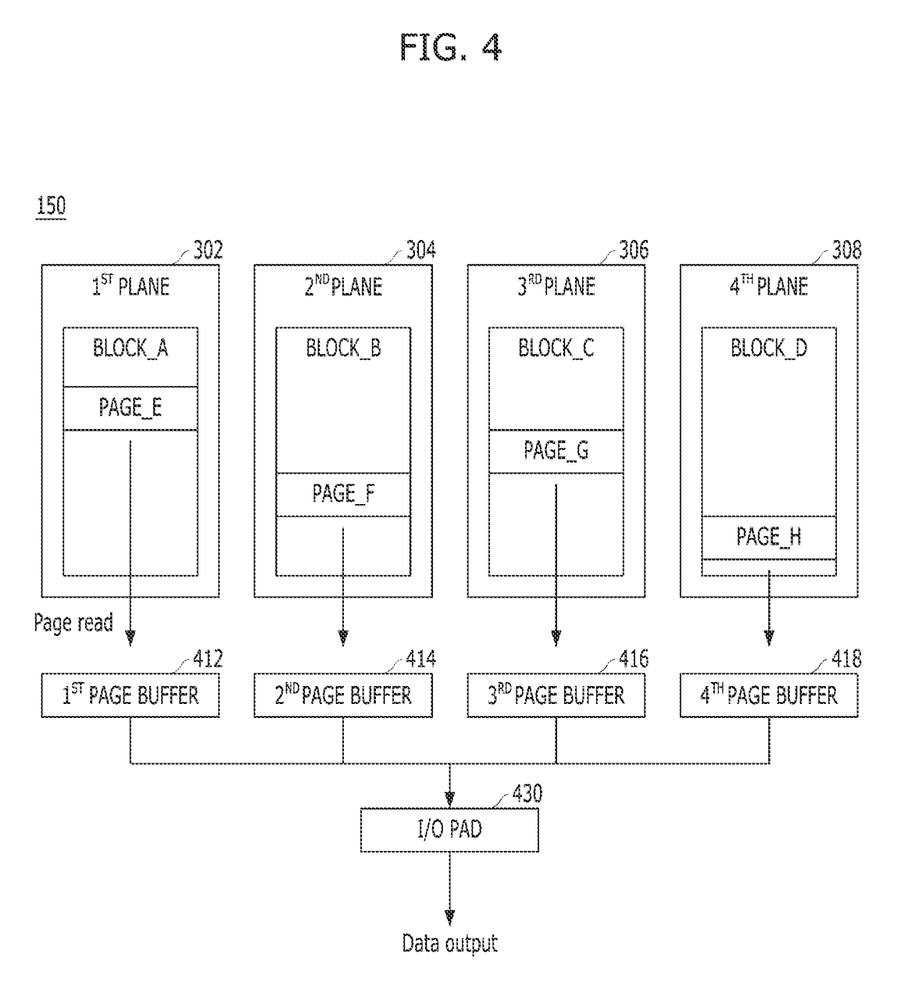
FIG. 4 is a block diagram for describing a multi-plane read operation of a memory device.

FIG. 4 illustrates the memory device 150, which includes first to fourth planes 302, 304, 306 and 308, first to fourth page buffers 412, 414, 416 and 418 and an input/output pad 430. The memory device 150 illustrated in FIG. 4 corresponds to the memory device 150 described with reference to FIG. 2.

The multi-plane read operation may include a page read operation and a data output operation.

The memory interface 142 of FIG. 1 may provide page read commands for target planes, which are targets for the multi-plane read operation among the first to fourth planes 302, 304, 306 and 308. By way of example, FIG. 4 illustrates a case where all of the first to fourth planes 302, 304, 306 and 308 are selected as the target planes.

The memory device 150 may support the multi-plane read operation whether offsets of a page to be read in each of the target planes are the same or different. By way of example, FIG. 4 illustrates the multi-plane read operation when all offsets of blocks and pages to be read in the first to fourth planes 302, 304, 306 and 308 are different from one another. The memory interface 142 may provide a page read command by specifying a plane, a block and a page address of a target page to be read in each of the planes. In an example of FIG. 4, the memory interface 142 may sequentially provide a page read command for a page E of a block A of the first plane 302, a page read command for a page F of a block B of the second plane 304, a page read command for a page G of a block C of the third plane 306 and a page read command for a page H of a block D of the fourth plane 308.

The first to fourth planes 302, 304, 306 and 308 may simultaneously perform the page read operation in response to the page read commands. The data read from the first to fourth planes 302, 304, 306 and 308 may be buffered in the first to fourth page buffers 412, 414, 416 and 418, respectively.

The memory device 150 may perform the data output operation to output the data, which is buffered in the first to fourth page buffers 412, 414, 416 and 418, through the input/output pad 430 in response to a data output command from the memory interface 142. The memory device 150 may sequentially output the data, which is buffered in the first to fourth page buffers 412, 414, 416 and 418, through the input/output pad 430.

Hereinafter, a data output command according to one type of memory system that has been proposed is described with reference to FIG. 5, and a data output command simplified according to embodiments of the present disclosure is described with reference to FIGS. 6 and 7.

Figure 5:
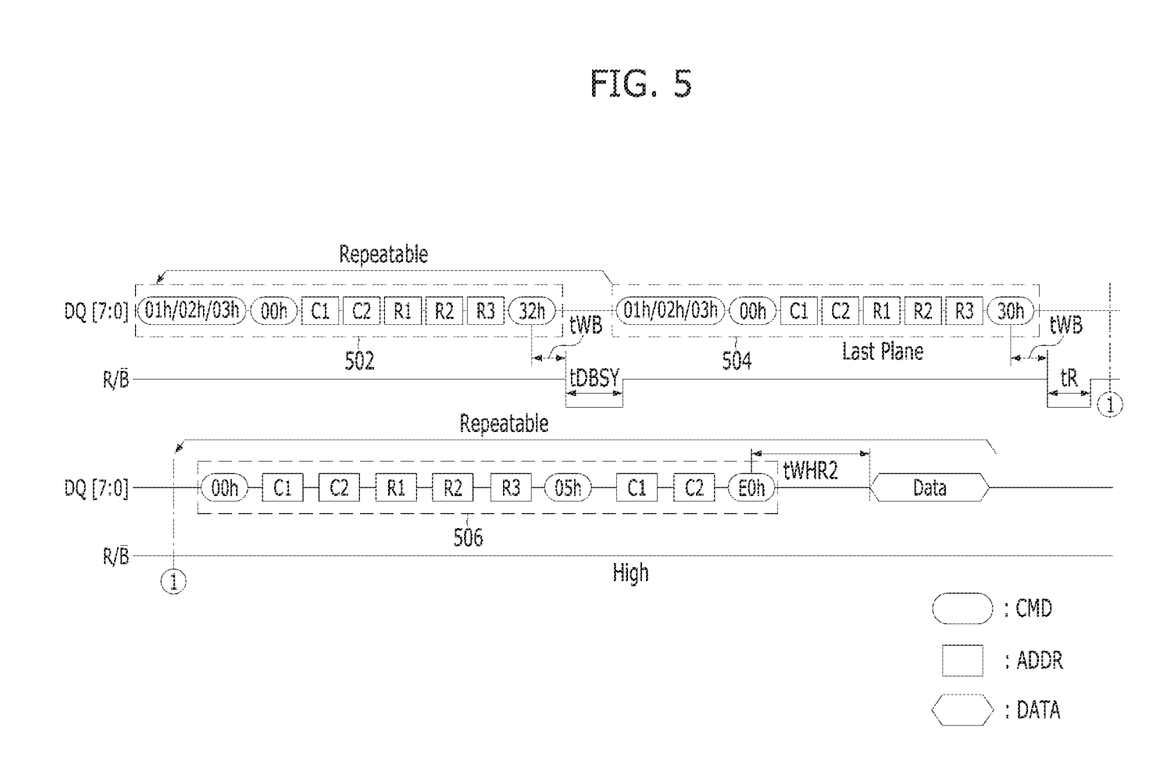
FIG. 5 is a timing diagram illustrating a multi-plane read operation according to one type of memory system that has been proposed.

FIG. 5 is a timing diagram illustrating a multi-plane read operation according to one type of memory system that has been proposed.

A memory interface 142 of FIG. 1 may provide a memory device 150 with a plurality of page read commands.

Referring to FIG. 5, a first command sequence 502 and a second command sequence 504 are page read commands for each target plane.

The first command sequence 502 may represent a page read command provided first or in the middle among the page read commands for the multi-plane read operation, and the second command sequence 504 may indicate a last page read command among the page read commands for the multi-plane read operation.

The first command sequence 502 may include a "01h/02h/03h" signal, a "00h" signal, a "C1-C2" signal indicating a column address of a target page, an "R1-R2-R3" signal indicating a row address of the target page and a "32h" signal. The "01h/02h/03h" signal may be selected according to which one of LSB, CSB and MSB of a selected page is read when a memory cell of the selected page is, for example, a triple level cell (TLC). The column address "C1-C2" signal of the target page may specify which target plane the target page belongs to. In the example of FIG. 4, when the "R1-R2-R3" signal specifies a page E PAGE_E, the "C1-C2" signal in the "C1-C2-R1-R2-R3" signal may specify a first plane 302. The "32h" signal may indicate that a subsequent page read command is further provided. An R/B signal may enter a dummy busy state when time tWB elapses after the "32h" signal is provided to the memory device 150, and change to a ready state after time tDBSY elapses.

The first command sequence 502 may be provided to the memory device 150 multiple times depending on the number of target planes. For example, when all the first to fourth planes 302, 304, 306 and 308 are the target planes, the first command sequence 502 may be provided three times, once for each of the first to third planes 302, 304 and 306.

The second command sequence 504 may include a "01h/02h/03h" signal, a "00h" signal, a "C1-C2" signal, an "R1-R2-R3" signal and a "30h" signal. The "01h/02h/03h" signal, the "00h" signal, the "C1-C2" signal and the "R1-R2-R3" signal are the same as described in the first command sequence 502. The "30h" signal may indicate that a corresponding command is the last page read command for the multi-plane read operation.

An R/B signal may indicate a ready state by entering a busy state when time tWB elapses after the "30h" signal is provided to the memory device 150 and changing to a logic high level after time tR elapses.

The target planes may simultaneously perform a page read operation. The target planes may perform the page read operation within time tR. Data read from a target page in each of the target planes may be buffered in a page buffer corresponding to each of the target planes.

When the R/B signal changes to the ready state after time tR elapses, the controller 130 may provide the memory device 150 with a data output command in order to output the data buffered in a plurality of page buffers.

A third command sequence 506 is a data output command for one target plane. The third command sequence 506 may include a "00h" signal, a column address "C1-C2" signal and a row address "R1-R2-R3" signal of a target page, a "05h" signal, a "C1-C2" signal indicating a target plane and an "E0h" signal. That is, three command cycles and seven address cycles may be required to provide the data output command for one target plane. When the "E0h" signal is provided and time tWHR2 elapses, the memory device 150 may output data buffered in a page buffer corresponding to the one target plane.

According to one type of memory system that has been proposed, the memory interface 142 needs to provide the memory device 150 with as many data output commands as there are target planes, in order to output all data related to the multi-plane read operation. For example, when all the first to fourth planes 302, 304, 306 and 308 are target planes, the memory interface 142 needs to provide the data output command four times. When the data output command is provided four times, a total of 40 clock cycles may be required to output the data buffered in the page buffer by the multi-plane read operation.

Furthermore, when the memory system 110 includes a plurality of memory devices, and the memory interface 142 needs to instruct the multi-plane read operation for the plurality of memory devices, the number of clock cycles required for one memory interface 142 to provide the plurality of memory devices with the data output command may further increase. The increasing number of clock cycles may cause a bottleneck of the memory interface 142.

When the number of clock cycles required to provide the data output command can be reduced, the total time required to perform the multi-plane read operation may be reduced.

According to embodiments of the present disclosure, the memory interface 142 may reduce the number of clock cycles, required to provide the data output command, by providing the data output command from which at least a portion of address information is omitted.

Even though an address of a target page is omitted when the memory interface 142 provides the data output command, the memory device 150 may output data stored in the target page. This is because data of the target page may be buffered in a page buffer during the page read operation, and the memory device 150 may perform a data output operation by accessing the page buffer without directly accessing the target page.

According to embodiments of the present disclosure, time required to provide the data output command may be reduced, and current consumption for providing the data output command may be also reduced. Furthermore, time required for the multi-plane read operation of the memory device 150 may be reduced, and bottleneck of the memory interface 142 may be alleviated.

Figure 6:
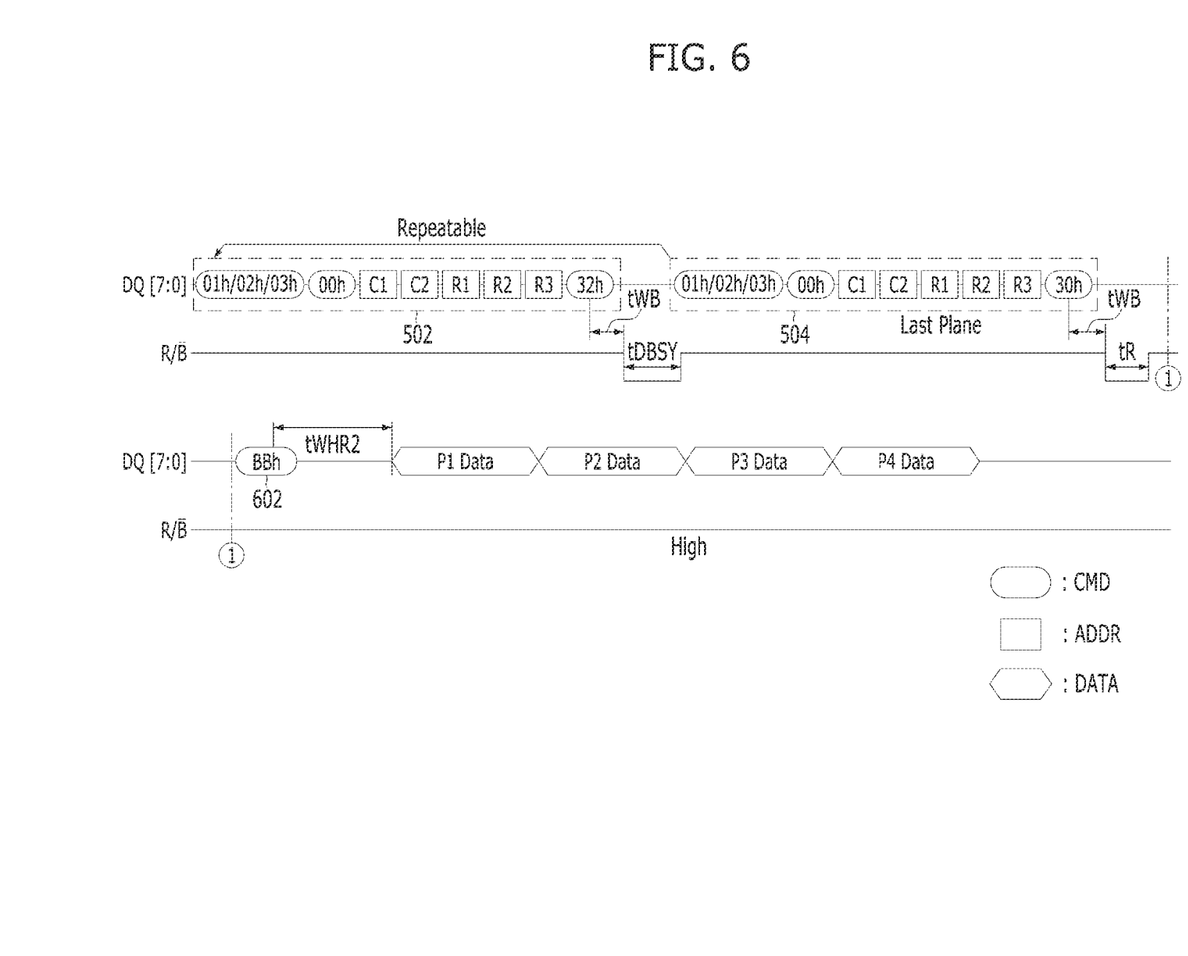
FIGS. 6 and 7 are timing diagrams illustrating a multi-plane read operation in accordance with embodiments.

FIG. 6 is a timing diagram illustrating a multi-plane read operation in accordance with a first embodiment.

First and second command sequences 502 and 504 in FIG. 6 represent page read commands for each target plane, and are the same as the first and second command sequences 502 and 504 described above with reference to FIG. 5.

According to the first embodiment, when a page read operation in the multi-plane read operation is completely performed on target planes, a memory interface 142 may control a memory device 150 to sequentially output data buffered in all page buffers therein by providing an all-plane data output command 602 that requires one clock cycle.

Referring to FIG. 6, the all-plane data output command 602 is represented as "BBh". When time tWHR2 elapses after the all-plane data output command 602 is provided, the memory device 150 may sequentially output data buffered in page buffers corresponding to the first to fourth planes 302, 304, 306 and 308.

In order to output data buffered in four page buffers 412, 414, 416 and 418 corresponding to the four planes 302, 304, 306 and 308, according to FIG. 5, the memory interface 142 may require 40 clock cycles, and provide the data output command. However, according to the first embodiment, the memory interface 142 can provide the data output command in only one clock cycle. Thus, time required to provide the data output command may be reduced to ¹⁄₄₀ of the time it takes with the arrangement of FIG. 5. As the number of planes in the memory device 150 increases according to the trend to employ higher capacity memory devices, the time required to provide the data output command may be even more significantly reduced compared with the arrangement of FIG. 5.

The all-plane data output command 602 may be particularly effectively used when the multi-plane read operation needs to be performed on all planes in the memory device 150, such as when a sequential read operation needs to be performed.

The all-plane data output command 602 may also be used for a multi-plane cache read operation. A cache read operation refers to an operation in which the memory device 150 outputs data read from a specific page through an input/output pad, and simultaneously reads data from memory cells of a next page. The cache read operation may be mainly performed to read sequential data. The memory device 150 may perform the multi-plane cache read operation in which the cache read operation is simultaneously performed on all the planes to read the sequential data. When the memory device 150 performs the multi-plane cache read operation, data may be sequentially outputted from all page buffers in the memory device 150. Accordingly, the memory interface 142 may provide the memory device 150 with the all-plane data output command 602 whenever the data output operation in the multi-plane cache read operation is performed.

Figure 7:
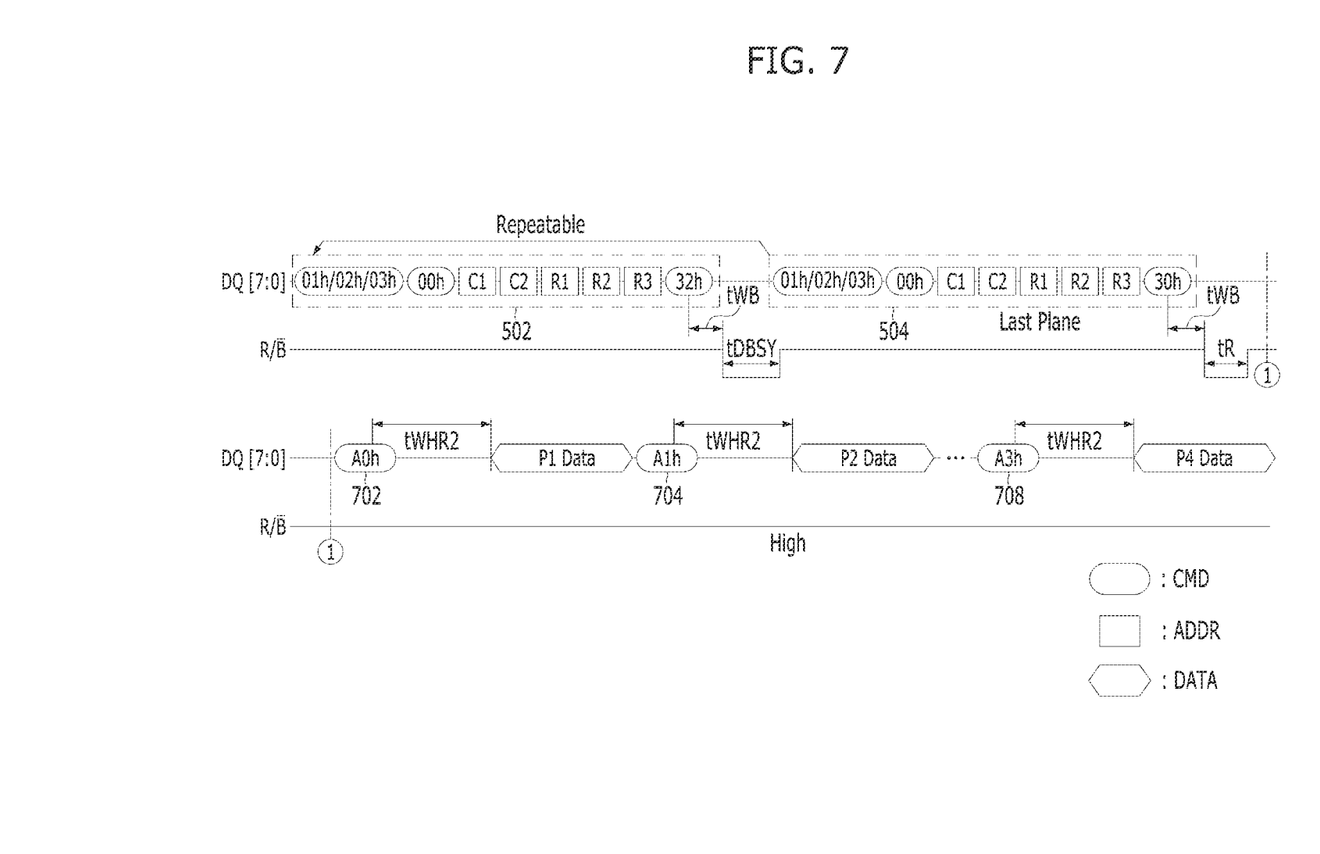

FIG. 7 is a timing diagram illustrating a multi-plane read operation in accordance with a second embodiment.

First and second command sequences 502 and 504 in FIG. 7 are the same as the first and second command sequences 502 and 504 described above with reference to FIG. 5.

According to the second embodiment, when the page read operation in the multi-plane read operation is completely performed on target planes, a memory interface 142 may provide a data output command for each plane that requires one clock cycle to output data of a page buffer corresponding to one target plane.

Referring to FIG. 7, data output commands 702, 704, ..., and 708 for the respective planes are represented as "A0h", "A1h", ..., and "A3h". The respective-plane data output commands 702, 704, ... and 708 may correspond one to one with the respective planes. For example, when the memory interface 142 provides the memory device 150 with the "A0h" signal (i.e., 702), the memory device 150 may output data buffered in the first page buffer 412 corresponding to the first plane 302 after time tWHR2 elapses. Subsequently, when the controller 130 provides the memory device 150 with the "A1h" signal (i.e., 704), the memory device 150 may output data buffered in the second page buffer 414 corresponding to the second plane 304 after time tWHR2 elapses.

When data buffered in the four page buffers 412, 414, 416 and 418 are outputted, the respective-plane data output command that requires a total of four clock cycles may be provided according to the second embodiment. Compared to the arrangement of FIG. 5, the time required to provide the respective-plane data output command according to the second embodiment may be reduced to 1/10 of the time required in FIG. 5.

The respective-plane data output commands 702, 704, ... and 708 may specify a page buffer, to which data is outputted, among the plurality of page buffers 412, 414, 416 and 418 included in the memory device 150. Accordingly, the respective-plane data output commands 702, 704, ... and 708 may be particularly effectively used when the multi-plane read operation needs to be performed on some target planes of the memory device 150, such as when a random read operation is performed.

Depending on implementation, the memory interface 142 may selectively provide the memory device 150 with the all-plane data output command 602 in FIG. 6 or the respective-plane data output commands 702, 704, ... and 708 in FIG. 7 when performing the multi-plane read operation. For example, the memory interface 142 may provide the memory device 150 with the all-plane data output command 602 when performing the multi-plane read operation on all planes of the memory device 150. In addition, when performing the multi-plane read operation on some planes of the memory device 150, the memory interface 142 may provide the respective-plane data output commands for the target planes.

According to embodiments of the present disclosure, the controller 130 may reduce the time, required for the multi-plane read operation, by controlling the memory device 150 by using a simplified data output command. Accordingly, performance of the memory system 110 may be improved.

While specific embodiments have been illustrated and described, it will be apparent to those skilled in the art that various changes and modifications may be made without departing from the scope of the invention. Therefore, the scope of the present invention is not limited to the described embodiments, but encompasses all variations that fall within the scope of the claims including their equivalents.

What is claimed is:

1. An operating method of a memory system that includes a memory device including a plurality of planes and a plurality of page buffers for the plurality of planes, respectively, and a controller configured for controlling the memory device, the operating method comprising:
   providing, by the controller, the memory device with page read commands including target page addresses of respective target planes among the plurality of planes;
   simultaneously reading, by the memory device, data from the respective target planes and buffering the data in target page buffers corresponding to the respective target planes in response to the page read commands;
   selectively providing, by the controller, the memory device for a sequential read operation with an all-plane data output command from which the target page addresses are omitted or for a random read operation with respective-plane data output commands from which the target page addresses are omitted; and
   sequentially outputting, by the memory device without directly accessing a target page, the data buffered in the target page buffers, in response to the all-plane data output command in one clock cycle or the respective-plane data output commands in one clock cycle for each respective target plane,
   wherein the all-plane data output command includes simultaneously performing, on all planes, a cache read operation in which the memory device outputs data read from a specific page through an input/output pad and simultaneously reads data from memory cells of a next page, and
   wherein each respective-plane data output command corresponds one to one with each respective target plane.

2. The operating method of claim 1, wherein the selectively providing includes providing the memory device with the all-plane data output command when all the plurality of planes are the respective target planes.

3. The operating method of claim 2, wherein the providing the memory device with the all-plane data output command includes providing the all-plane data output command for a single command cycle.

4. The operating method of claim 1, wherein the selectively providing includes providing the memory device with the respective-plane data output commands corresponding to the respective target planes when some of the plurality of planes are the respective target planes.

5. The operating method of claim 4, wherein the providing the memory device with the respective-plane data output commands corresponding to the target planes includes providing each of the respective-plane data output commands for a single command cycle.

6. The operating method of claim 4, wherein the sequentially outputting of the data buffered in the target page buffers includes:
   outputting data corresponding to a page buffer corresponding to a single plane, in response to one of the respective-plane data output commands for the single plane, until all data buffered in the target page buffers are output.

7. A memory system comprising:
   a memory device including a plurality of planes and a plurality of page buffers for the plurality of planes, respectively; and
   a controller configured for controlling the memory device,
   wherein the controller provides the memory device with page read commands including target page addresses of respective target planes among the plurality of planes,
   wherein the memory device simultaneously reads data from the respective target planes and buffers the data in target page buffers corresponding to the respective target planes in response to the page read commands,
   wherein the controller selectively provides the memory device for a sequential read operation with an all-plane data output command from which the target page addresses are omitted or for a random read operation with respective-plane data output commands from which the target page addresses are omitted; and
   wherein the memory device sequentially outputs the data buffered in the target page buffers without directly accessing a target page, in response to the all-plane data output command in one clock cycle or the respective-plane data output commands in one clock cycle for each respective target plane,
   wherein the all-plane data output command includes simultaneously performing, on all planes, a cache read operation in which the memory device outputs data read from a specific page through an input/output pad and simultaneously reads data from memory cells of a next page, and
   wherein each respective-plane data output command corresponds one to one with each respective target plane.

8. The memory system of claim 7, wherein the controller provides the memory device with the all-plane data output command when all the plurality of planes are the respective target planes.

9. The memory system of claim 8, wherein the controller provides the all-plane data output command for a single command cycle.

10. The memory system of claim 7, wherein the controller provides the memory device with the respective-plane data output commands corresponding to the respective target planes when some of the plurality of planes are the respective target planes.

11. The memory system of claim 10, wherein the controller provides each of the respective-plane data output commands for a single command cycle.

12. The memory system of claim 10, wherein the memory device sequentially outputs the data buffered in the target page buffers by repeatedly performing an operation of outputting data corresponding to a page buffer corresponding to a single plane, in response to one of the respective-plane data output commands for the single plane until all the data buffered in the target page buffers are outputted.

13. A memory system comprising:
   a memory device including a plurality of planes and a plurality of page buffers corresponding to the plurality of planes; and
   a controller configured to control the memory device,
   wherein the controller provides the memory device with multiple read commands for the plurality of planes,
   wherein the memory device simultaneously reads data from target pages of the plurality of planes and buffers the data in the plurality of page buffers in response to the multiple read commands,
   wherein the controller provides the memory device with a data output command associated with all or each of the plurality of planes, the data output command configured to exclude addresses of the target pages; and
   wherein the memory device sequentially outputs to the controller without directly accessing a target page, the data buffered in the plurality of page buffers, in response to the data output command associated with all of the plurality of planes in one clock cycle, and in response to the data output command associated with each of the plurality of planes in one clock cycle for each respective plane,
   wherein the data output command associated with all of the plurality of planes includes simultaneously performing, on all planes, a cache read operation in which the memory device outputs data read from a specific page through an input/output pad and simultaneously reads data from memory cells of a next page, and
   wherein each data output command associated with each of the plurality of planes corresponds one to one with each respective plane.

* * * * *